US005506846A

United States Patent [19]

Edem et al.

[11] Patent Number: 5,506,846
[45] Date of Patent: Apr. 9, 1996

[54] LOCAL LOOPBACK OF ISOCHRONOUS DATA IN A SWITCHING MECHANISM

[75] Inventors: Brian C. Edem, San Jose; Debra J. Worsley, Sunnyvale; Michael S. Evans, San Jose, all of Calif.

[73] Assignee: National Semiconductor Corporation, Santa Clara, Calif.

[21] Appl. No.: 226,403

[22] Filed: Apr. 12, 1994

Related U.S. Application Data

[63] Continuation of Ser. No. 969,910, Nov. 2, 1992, abandoned.
[51] Int. Cl.[6] .................................................. H04L 12/44
[52] U.S. Cl. .................... 370/94.2; 370/94.3; 370/112; 370/67
[58] Field of Search .................................. 370/85.1–85.3, 370/85.13, 85.12, 85.14, 85.15, 60, 60.1, 58.1, 94.2, 84, 85.5, 110.1, 112, 66, 67, 68, 41, 42, 94.3, 56; 340/825.5

[56] References Cited

U.S. PATENT DOCUMENTS 4,220,816  9/1980  Howells et al. ........................ 370/24

(List continued on next page.)

OTHER PUBLICATIONS

Shimizu, H. et al., 'IVDLAN Standardization and Development', IEICE Transactions, vol. E74, No. 9, Sep. 1991, Tokyo, JP, pp. 2696–2702.
Integrated PBX Systems, An NCC State of the Art Report, The National Computing Centre Limited, 1987.
ISDN Basic Rate Interface System Design Guide, Telenetworks document, Aug, 1989.
ISDN Primary Rate Interface System Design Guide, Telenetworks document, Jul., 1989.
Draft Supplement to IEEE STD 802.3 CSMA/CD Access Method and Physical Layer Specifications, The Institute of Electrical and Electronic Engineers, Inc., (Nov. 15, 1989).
Apple Computer drawings, Mar. 5, 1990.
Irube et al., "Integrated Information and Communication System for Business Networks" Hitachi Review 40(3):241–247 (1991).
HMUX ERX "FDDI–II Hybrid Multiplexor" Rev. 2.4, 1991.
IBM Corporation "Task Order," pp. 6–7, 1992.
DP8390"Network Interface Controller: An Introductory Guide," LAN Databook, pp. 206–213, 1992.
DP83932B "Systems–Oriented Network Interface Controller," LAN Databook, pp. 288–383, 1992.
DP83950A "Repeater Interface Controller," LAN Databook, pp. 3–75, 1992.
DP83950EP at IEEE 802.3, Multi-Port Repeater Evaluation Kit, LAN Databook, pp. 75–87, 1992.
IEEE 802.9 Draft Standard Integrated Services (IS) LAN Interface at the MAC and PHY Layers, Institute of Electrical and Electronics, Nov., 1992.
"National Proposes Isochoronous Ethernet," Electronic News, vol. 38, No. 1940, p. 19, Nov., 1992.
"IBM's Multimedia Venture: Opportunity for its Hardware?", vol. 38, No. 1930, p. 1, Sep., 1992.

Primary Examiner—Douglas W. Olms
Assistant Examiner—Chau T. Nguyen
Attorney, Agent, or Firm—Limbach & Limbach

[57] ABSTRACT

A data communication system such as a local area network or a wide area network capable of transmitting isochronous data. The system conveys both isochronous data and non-isochronous data by time multiplexing data into a recurring frame structure on a 4-bit nibble basis. The arriving data is de-multiplexed at a hub into separate channels which are forwarded to separate hardware appropriate for handling the particular data stream. The data is passed hierarchically from a source, through a node, and to a hub. The hub places the data into an internal connection memory for switching onto a high bandwidth bus for distribution to other destination hubs, nodes, or sinks, except, where the source node and destination node are attached to the same hub, the hub provides a local loopback to the destination node, thus avoiding the need to place the transmitted data onto the bus. This system conserves room on the bus for other isochronous and non-isochronous data.

22 Claims, 14 Drawing Sheets

U.S. PATENT DOCUMENTS

| | | | |
|---|---|---|---|
| 4,258,434 | 3/1981 | Glowinski et al. | 370/60 |
| 4,412,324 | 9/1983 | Glowinsky et al. | 370/58.1 |
| 4,445,213 | 4/1984 | Baugh et al. | 370/94.2 |
| 4,530,088 | 7/1985 | Hamstra et al. | 370/110.1 |
| 4,549,292 | 9/1985 | Isaman et al. | 370/85.15 |
| 4,577,312 | 3/1986 | Nash | 370/84 |
| 4,587,650 | 5/1986 | Bell | 370/85.15 |
| 4,637,014 | 1/1987 | Bell et al. | 370/85.15 |
| 4,766,590 | 8/1988 | Hamada et al. | 370/85.15 |
| 4,769,813 | 9/1988 | Lenart | 370/60 |
| 4,845,609 | 7/1989 | Lighthart et al. | 370/85.15 |
| 4,961,188 | 9/1990 | Lau | 370/100.1 |
| 5,001,707 | 3/1991 | Kositpaiboon | 370/94.1 |
| 5,179,554 | 1/1993 | Lomicka et al. | 370/85.13 |
| 5,189,414 | 2/1993 | Tawara | 340/825.5 |

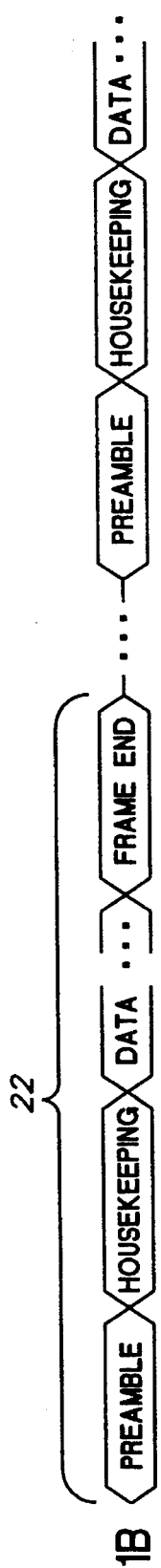
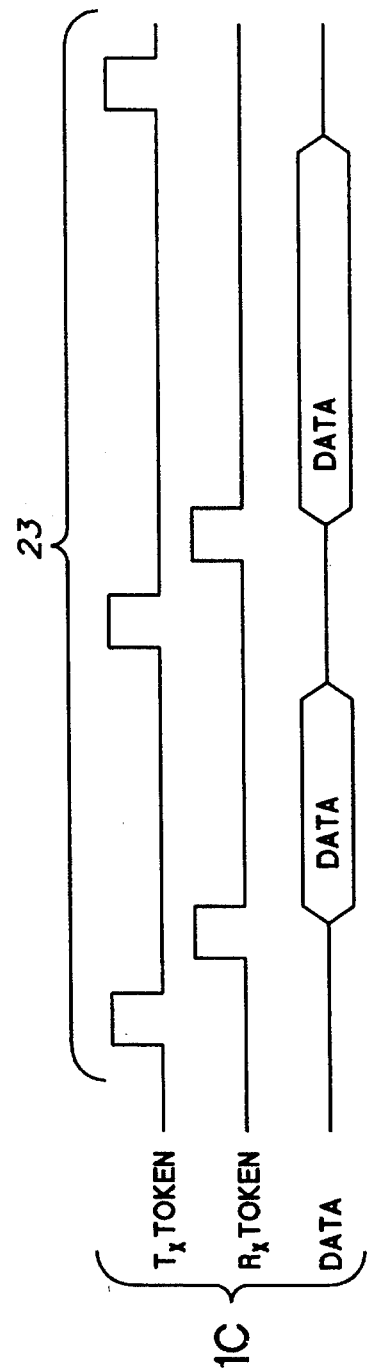
Fig 1B
Fig 1C
Fig 1A

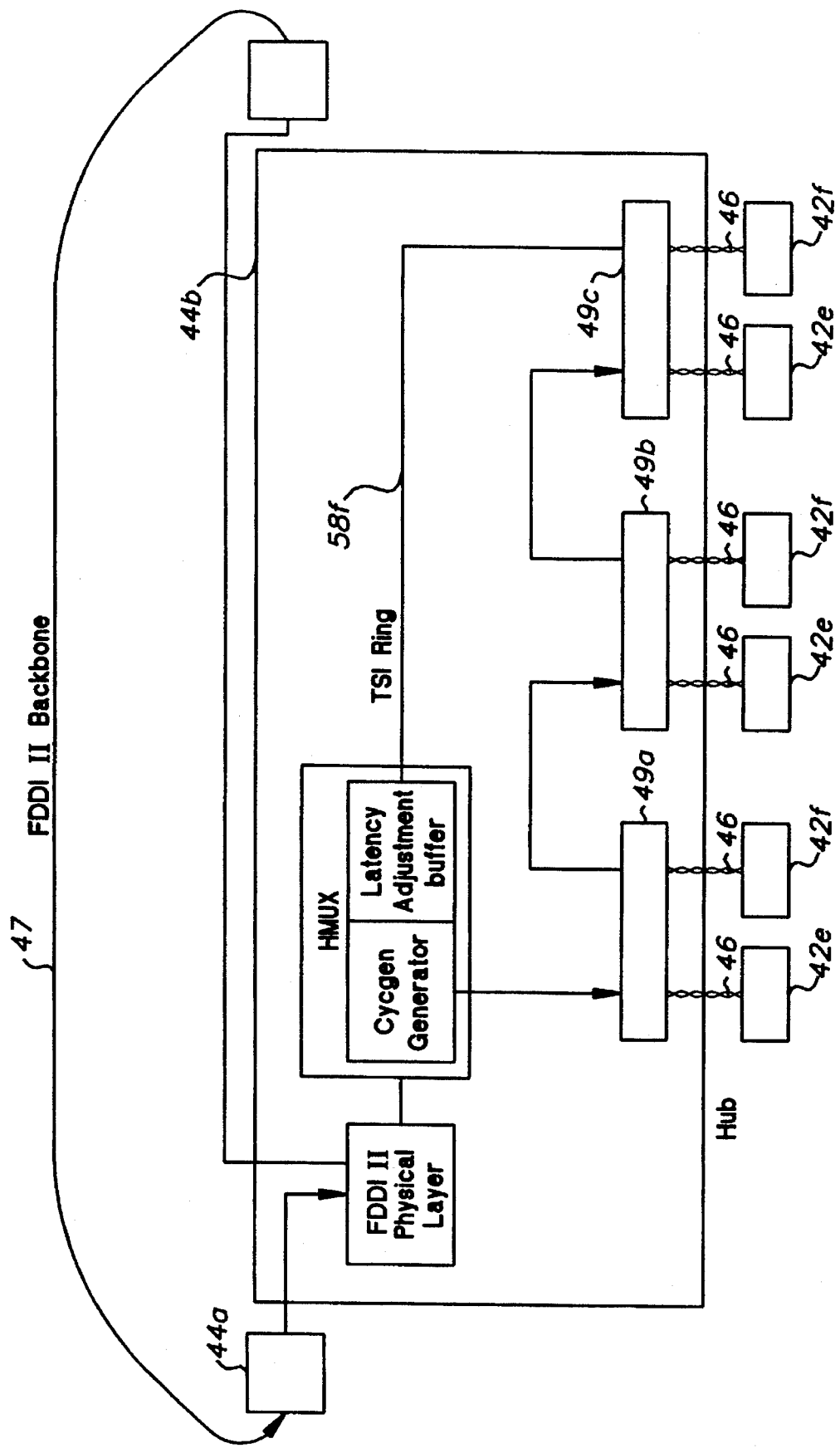

LOCAL LOOPBACK OF ISOCHRONOUS DATA IN A SWITCHING MECHANISM

This is a continuation of application Ser. No. 07/969,910 filed on Nov. 2, 1992 now abandoned.

The present invention relates to a data communication network, such as a local area network or wide area network, and in particular to a network for transferring isochronous data.

BACKGROUND OF THE INVENTION

Isochronous data can generally be described as data which is non-packetized, and of indeterminate, potentially continuous duration. Examples of isochronous data sources include video cameras, which output a substantially continuous stream of data representing images and associated sounds, and telephones, which output a substantially continuous stream of voice data. An example of an isochronous data sink is a video monitor which receives a substantially continuous stream of video data for display.

FIG. 1A schematically depicts isochronous data transfer. The data transfer or "connection" is first initiated, such as by initiating a telephone conversation or beginning a video camera transmission 12. After initiating the data transfer, transmission of the data or possibly accompanied by housekeeping information (such as destination, source, audio or video timing and the like) is provided substantially continuously for an indeterminate period, until termination of the telephone conversation or video transmission 14. Every bit transferred need not necessarily represent a data bit. "Housekeeping" bits to control destination and audio or video timing may be also transferred. Furthermore, the data being transferred may comprise "Null" data such as silence during a telephone conversation or transfer of a blank video image. One type of isochronous data transfer is the Fiber Distributed Data Interface-II (FDDI-II) as described, for example, in *FDDI-II Hybrid Multiplexer,* Revision 2.4 dated Mar. 25, 1991.

The increasing availability of multi-media computers and work stations that include isochronous data sources and sinks in addition to non-isochronous sources and sinks has increased interest in the transfer of isochronous data in a network environment. Many existing networks use non-isochronous data communications between stations on the network. Commonly used data transfer protocols include packet transfer systems and Token Ring systems.

An example of packetized data transfer is the commonly-used ethernet system. One implementation known as 10BASE-T is described in the draft Nine supplement to IEEE standard 802.3, dated Nov. 15, 1989. FIG. 1B shows a packet transfer 22.

In a token ring system, a node transfers data only upon receipt of an electronic token. One commonly used token ring system is described in IEEE standard 802.5 FIG. 1C shows a data transfer 23 in a token ring system.

Many previous attempts to accommodate isochronous data on these existing data networks result in disadvantageous operating characteristics. In some systems, the bandwidth available for a given isochronous source or sink degrades in direct proportion to the total number of isochronous data sources and sinks transmitting and receiving on the network. Furthermore, the presence of isochronous sources and sinks also degrades non-isochronous bandwidth.

In addition, existing isochronous systems also provide little or no compatibility with previous networks. This incompatibility necessitates extensive replacement of hardware or software to accommodate both isochronous and non-isochronous traffic. Thus, a multi-media PC having ethernet capabilities and a video camera cannot simultaneously utilize both the isochronous and non-isochronous source/sinks.

SUMMARY OF THE INVENTION

Copending application Ser. No. 07/969,916, titled "Network for Data Communication with Isochronous Capability" filed the same day herewith, and incorporated by reference, describes a system that provides for communication of data to and from isochronous data sources and sinks. The bandwidth available to an isochronous source/sink is independent of changes in non-isochronous demand on the network and vice versa. Furthermore, each source/sink is guaranteed an isochronous bandwidth which is independent of changes of source/sink bandwidth demands on the network. The isochronous communication system also maintains a high degree of compatibility with previous, often in-place, systems, thus requiring only minimal replacement of hardware/software. For example, the effective data rate of the isochronous data is unchanged by changes in the bandwidth or traffic in the non-isochronous data or by interruptions in the non-isochronous data (such as data collisions in ethernet data or a token loss in the case of token ring data).

Preferably, the system is implemented as a star-topology network with data sources transmitting to a central hub which, in turn, transmits the data to data sinks. Several such star-topology systems can be connected by interconnection of the hubs to high bandwidth buses, e.g., time slot interchange (TSI) bus, for example, in a ring structure or tree structure. Multiplexed data arriving at the hub is de-multiplexed to separate the isochronous-source data, the non-isochronous-source data and D channel and M channel information. The non-isochronous-source data can be provided to hub circuitry specialized for handling the non-isochronous data stream. Preferably, circuitry in the hub converts the separated non-isochronous data stream into a form substantially similar to the form available over previous non-isochronous networks. For example, where non-isochronous data is sourced from an ethernet MAC, the hub converts the separated non-isochronous data to a form handled by standard ethernet hub repeater circuitry.

Similarly, the isochronous-source data can be provided to hub circuitry specialized for handling the isochronous data stream. According to one embodiment of the present invention, the hub isochronous data circuitry includes a local loopback capability. In situations where the source node and destination node are coupled to the same hub circuitry, the local loopback capability enables the hub to transfer data between the nodes without first placing the data on TSI bus interconnecting the hubs. The TSI bus bandwidth is thereby unaffected by the internal transfer. Thus, the capacity of the system to interconnect nodes on different hubs is not impacted by transfers between nodes connected to the same hub.

According to another embodiment of the invention, the local loopback may be used in any network topology in which a source node and destination node are connected to the same hub and the hubs interconnect with each other via a high bandwidth bus. Thus, the present invention provides a system for completing such transfers without impacting the bus external bandwidth.

BRIEF DESCRIPTION OF THE DRAWINGS

FIG. 1A is a timing chart of an isochronous data frame transmission;

FIG. 1B is a timing chart for a packetized data transmission;

FIG. 1C is a timing chart for a token ring data transfer;

FIG. 2B is a diagram of a star and ring topology communication system having multiple isochronous circuitry within a single hub;

DETAILED DESCRIPTION OF THE PREFERRED EMBODIMENT

The detailed description of this invention is given in the context of a data transfer system that supports both non-isochronous and isochronous communication. The description provided herein therefore enables a discussion of the invention as employed for:

1) transfers between a non-isochronous source and non-isochronous sink connected to the same hub; and
2) transfers between an isochronous source and an isochronous sink connected to the same hub.

The description therefore illustrates several of the more common situations in which the invention might be used. The invention, however, is not limited to use solely in conjunction with the specific isochronous/non-isochronous data transfer system described and may readily be incorporated into any data transfer system where communications between nodes occurs via a hub.

General Overview of System Operation

Figure 2A:
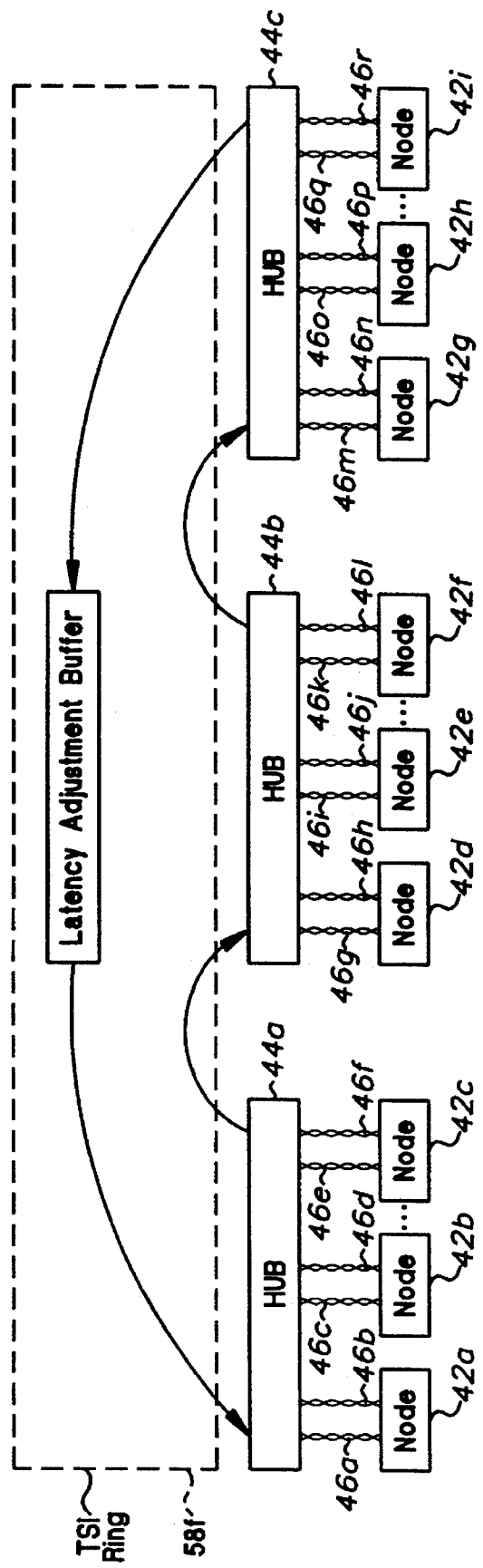
FIG. 2A is a diagram of a star and ring topology communication system according to an embodiment of the present invention.
Figure 2C:
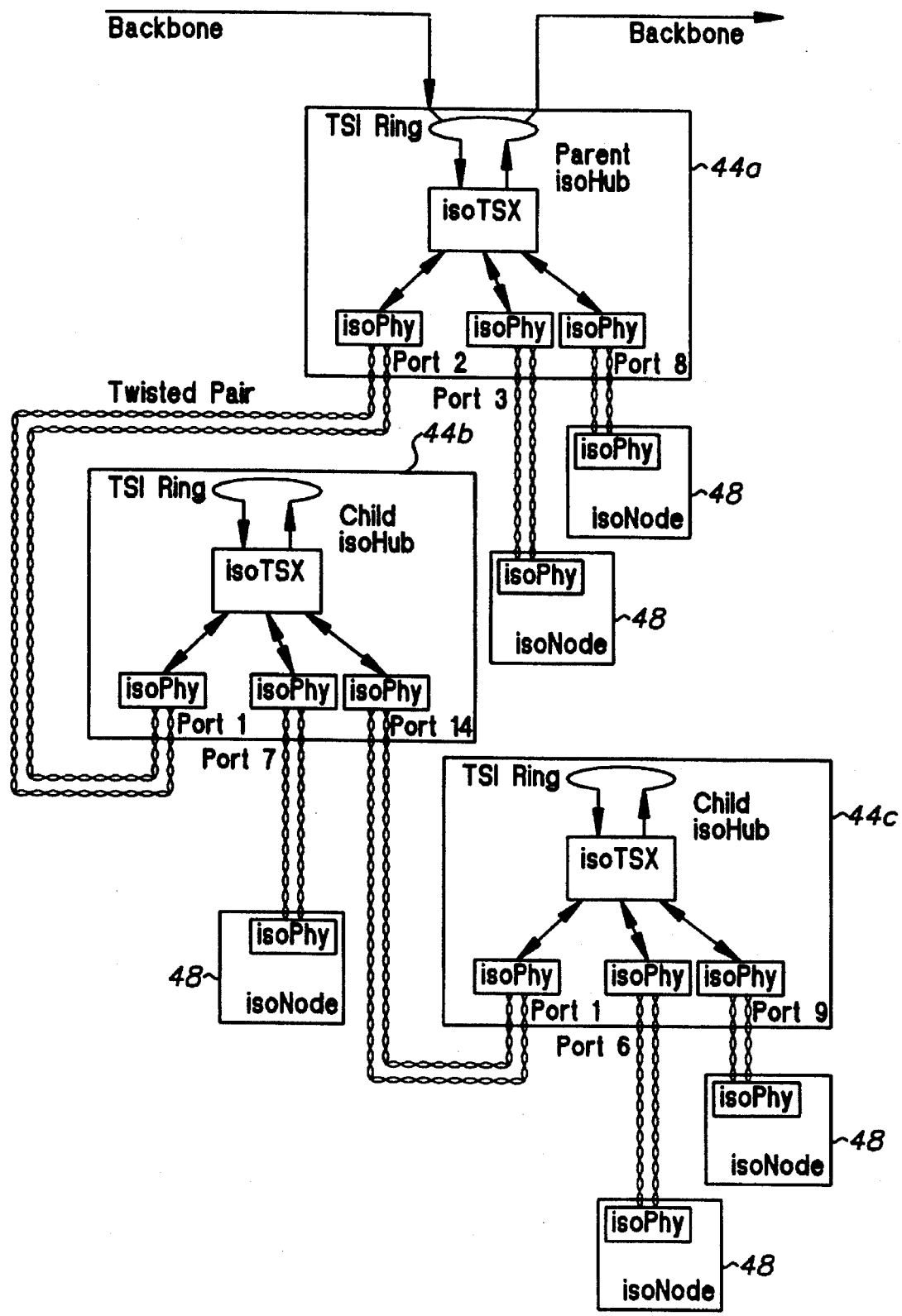
FIG. 2C is a diagram of a tree topology communication system according to an embodiment of the present invention.

Pending application Ser. No. 07/969,916, now abandoned, titled "Network for Data Communication with Isochronous Capability", filed the same day herein and incorporated by reference, describes a data communication system for isochronous data that can be configured in a star-topology and interconnected in a ring or tree topology. Such a system is shown in FIGS. 2A, 2B or 2C. In the configuration depicted in FIG. 2A, the hubs are connected in a ring-topology with first hub 44a sending data to the second hub 44b, the second hub 44b sending data to the third hub 44c, the third hub sending data back to the first hub 44a via a cycle generator and latency adjustment circuitry. The inter-hub connections over a Time Slot Interchange (TSI) ring 58f. In one embodiment, an FDDI-II system can be used as the TSI ring 58f. FIG. 2B shows hubs 44a, 44b and 44c arranged in a star and ring topology having multiple isochronous circuitry within a single hub. FIG. 2C shows a tree topology communication system. The parent hub 44a connects to a high bandwidth backbone. Hub 44b operates as a child hub of parent hub 44a and is attached at port 2 of hub 44a. Child hub 44a cascades from child hub 44b.

The star and ring topology includes a plurality of nodes 42a, 42b, 42c attached to a single hub operating on the high bandwidth bus. The exact number of nodes varies depending on the data transmission needs and objectives of the system. Each of the nodes 42a–42c can include various types of sources and sinks such as strictly isochronous sources and sinks, strictly non-isochronous sources/sinks or both isochronous and non-isochronous sources and sinks. Data links comprising physical data transmission media, such as one-way twisted pair wires 46a–46r, couple each node to one of hubs 44a–44c.

Figure 3:
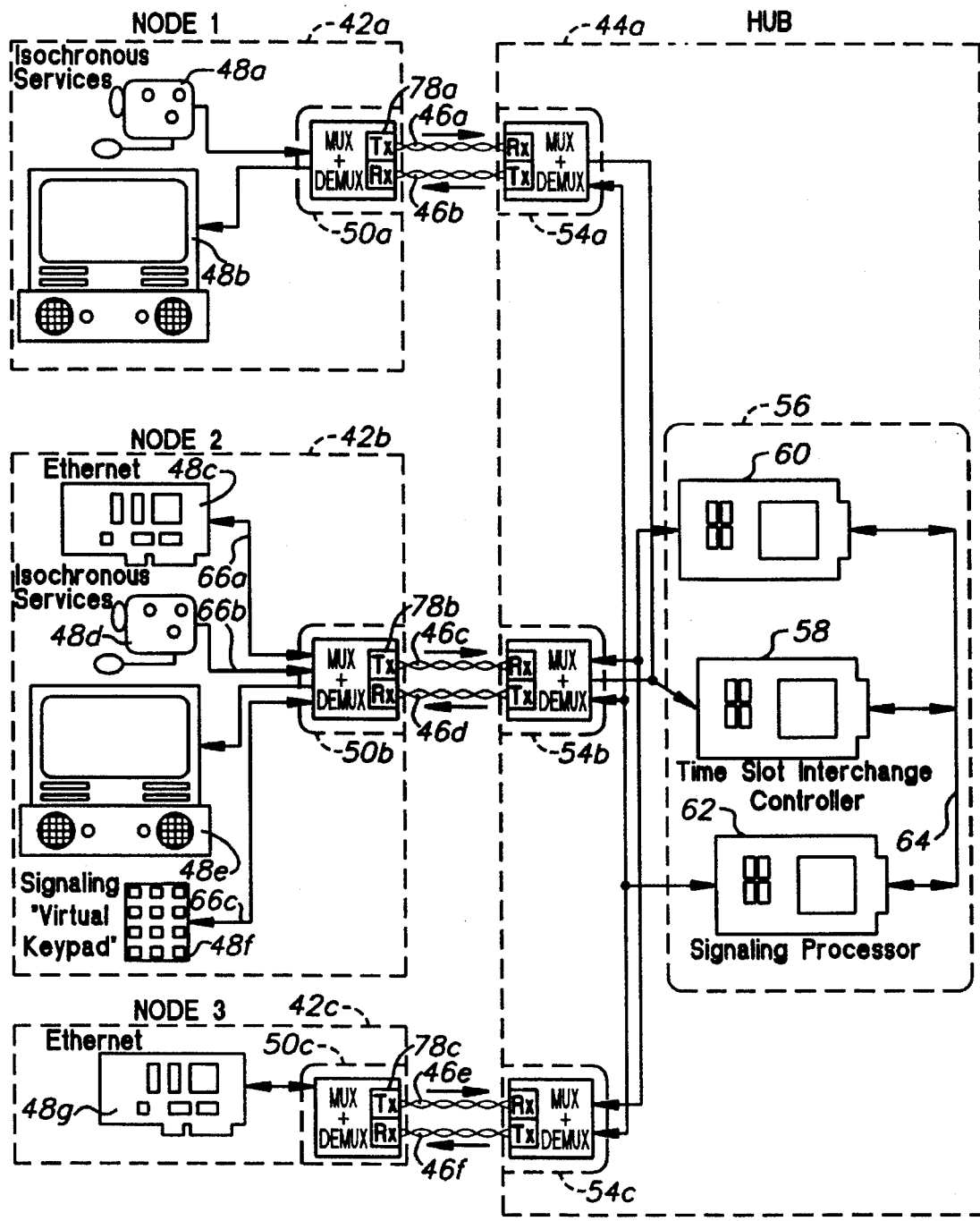
FIG. 3 is a communication system configured according to an embodiment of the present invention.

FIG. 3 shows hub 44a and associated nodes 42a–42c in greater detail. FIG. 3 may, by itself, form a complete star topology system. Each node 42a, 42b, 42c includes circuitry 50a, 50b, 50c. Circuitry 50a–c receives data, for conversion to a form suitable for transmission onto the physical media 46a, 46c, 46e; and receives signals from the physical media 46b, 46d, 46f for conversion to a form suitable for use by the data sinks.

Hub 44a includes circuitry 54a, 54b, 54c for receiving data from the physical media 46a, 46c, 46e; separating the isochronous-sourced data from the non-isochronous-sourced data and the D channel and M channel data; and converting separated data into a form suitable for handling by downstream hub circuitry 56. In the depicted embodiment the separated isochronous-sourced data is provided to isochronous switching circuitry such as a time slot interchange controller 58 for placing the data on a TSI bus so that it can be transported to and retrieved by other equivalent circuitry 54a–54c in the hub for transmission to various destination nodes 42a–42c to other hubs. The separated non-isochronous data is provided to circuitry 60 configured to convey the non-isochronous data for transmission to destination nodes 42a, 42b, 42c. In an embodiment in which non-isochronous-sourced data includes ethernet data, the hub circuitry 60 can be a standard ethernet repeater processor. In this way, the system can be at least partially backwards-compatible with previous ethernet hub systems.

The D channel and maintenance data is provided to a signaling processor 62. Signaling processor 62 performs various maintenance and control functions such as identifying and alerting users of error conditions, and setting up requested connections, i.e. source/destination paths e.g. by communicating with the isochronous and non-isochronous controllers 58, 60, e.g. over data path 64.

The operation of the components described above may be understood by describing the transfer of data from video camera, isochronous source, 48d to isochronous sink 48b and from Ethernet Mac, non-isochronous source 48c to non-isochronous sink 48g. Data sent from isochronous device 48d is a continuous stream of digitized data having, for example, a rate equal to the American "T1" standard of 1.544 Mbps. Data output from the ethernet MAC 48c is provided at the standard 10BASE-T ethernet rate of 10 Mb/sec. D channel information is provided from a D channel data stream source preferably contained in a MAC or other circuitry in the system, or, for example, from the virtual key pad 48f at a variable data rate, such as a rate not exceeding about 64 Kb/sec.

Figure 4:
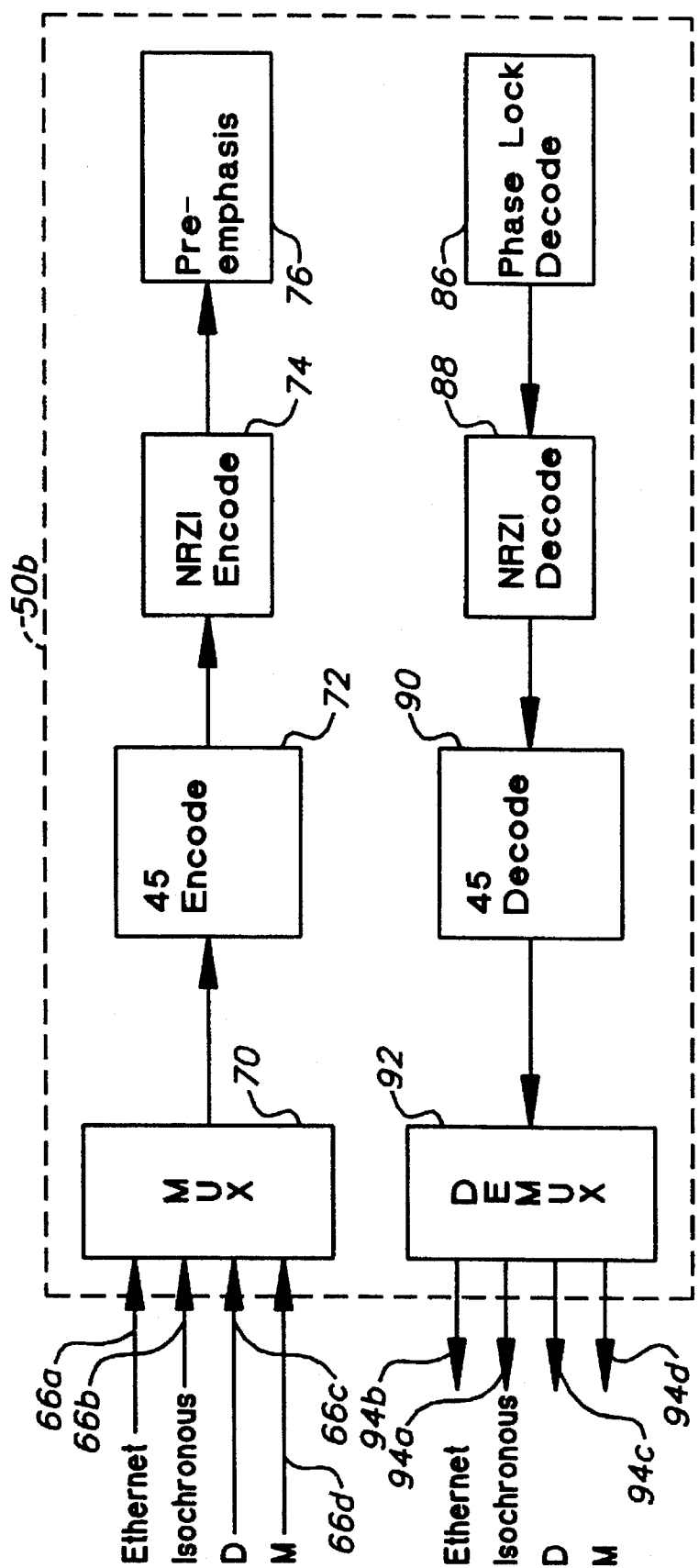
FIG. 4 is a block diagram of node circuitry according to an embodiment of the present invention.

Lines 66a, 66b, 66c carry the data streams from sources 48d and 48c to node circuitry 50b. FIG. 4 shows circuitry 50b in greater detail. Node circuitry 50b comprises hardware that operates on the incoming data stream to enable efficient, compatible transmission between the data source and destination. A multiplexer 70 time-division multiplexes the incoming data on a four-bit basis using a repeating series of frames or templates. In this embodiment, the frames are repeated every 125 micro seconds.

Table I tabulates a scheme for time-division multiplexing the various data streams, additional data and control bytes. Each symbol in Table I represents four bits of data and therefore every group of two symbols represents one 8-bit byte of data. In Table I, E represents four bits of data from the ethernet stream 66a, B designates four bits of data from the isochronous stream 66b and D represents four bits of data from the D channel stream 66c. M represents M channel data, which preferably is provided by circuitry 50b. In addition, certain byte-length patterns are provided. JK represents a frame synchronization pattern and EM (the first two bytes of block three in Table I) represents an ethernet "pad" followed by a maintenance byte.

As seen in Table I, each frame contains 256 bytes which can be considered in thirty-two groups of eight bytes each, or four blocks of sixty-four bytes each. For a data rate output from the isochronous source 48d of 1.544 Mb/sec. The frame structure described provides an isochronous bandwidth capability of 6.144 Mb/sec. Thus, the single isochronous source 48b in the present example can be entirely accommodated using only 48 of the 192 "B" symbols per frame. A basic rate ISDN Channel could be supported by using three 64 Kb/s slots within the isochronous channel. Thus, a variety of isochronous sources may be allocated among the available isochronous bandwidth. The frame structure is described more thoroughly in commonly-assigned application Ser. No. 07/969,911, titled "Network for Transmitting Isochronous-Source Data with a Frame Structure", filed on even date herewith and incorporated herein by reference. Frame structures other than that described could be used to provide an allocation of bandwidth suited for the particular purpose.

The time-multiplexed data is then encoded by an encoder 72 to maintain the AC balance of the cable which can be potentially upset by an extended string of binary zeros. In the depicted embodiment, the encoder performs four/five encoding. One particular form of four/five encoding, conforming partially to the ANSII X3T9.5 standard, is described by Table II. These patterns, when properly combined, have a maximum of three bit times with no transition. The encoding scheme depicted in Table II is described in greater detail in commonly-assigned application Ser. No. 07/970,329, now U.S. Pat. No. 5,361,261, titled "Frame-Based Transmission of Data", filed on even date herewith and incorporated herein by reference.

The results of the four/five encoding is then further encoded by encoder 74 of FIG. 4 using a non-return to zero, inverted (NRZI) scheme. The four/five-NRZI encoding is particularly useful in networks in which a non-isochronous source is a 10BASE-T ethernet source because the encoding provides for transmission at a signaling rate substantially compatible with the data rates provided and expected by the ethernet MAC. Other types of encoding or decoding, however, can also be used such as a scheme encoding 8 bits into 10 bits.

After encoding, the data is sent to pre-emphasis circuitry 76 and to a transmitter or driver 78b. Pre-emphasis circuitry 76 compensates the signal transmitted onto the physical medium to reduce jitter. The signal is then transmitted over the physical medium 46c to hub 44a which can include twisted pair, coaxial or fiber optic cable.

Figure 5:
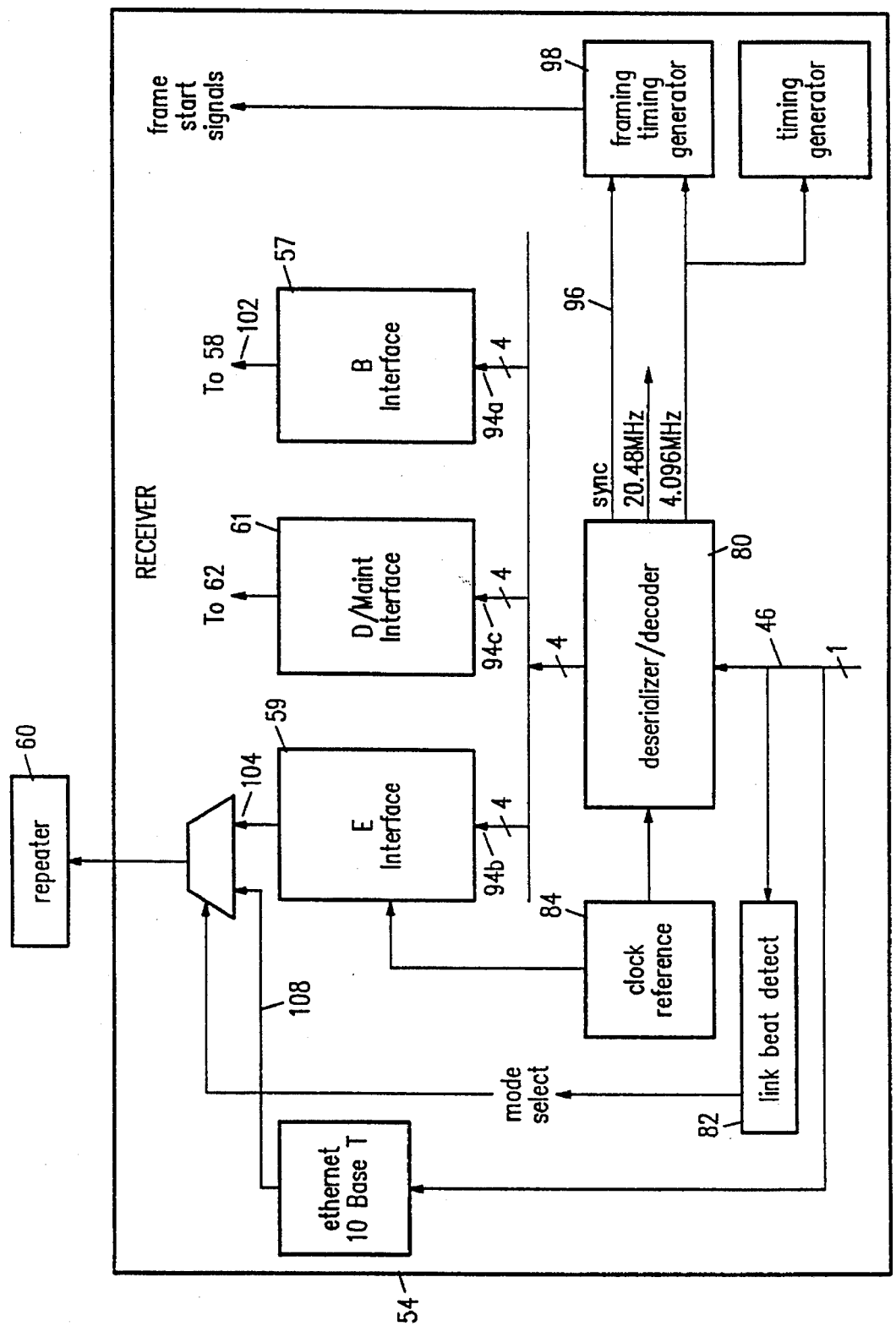
FIG. 5 is a block diagram of hub receiver circuitry according to an embodiment of the present invention.

Hub 44a as seen in FIG. 3 comprises a plurality of circuit devices 54a, 54b, 54c, each one coupled to one of nodes 42a, 42b, 42c by physical media 46. As depicted in FIG. 5, the data transmitted over the physical media 46 arrives serially at a de-serializer/decoder 80. De-serializer/decoder 80 includes circuitry which is functionally an inverse of the multiplexing/encoding circuitry described above and operates to decode the four/five NRZI encoding and to separate the isochronous and non-isochronous sourced data. De-serializer/decoder 80 also outputs a synchronization signal, derived from the JK frame synchronization symbols 96 for use by a framing timing generator 98. Link detect circuitry 82 also receives the data from the physical media 46 for detection of the mode in which the node is operating (e.g. 10BASE-T, isochronous ethernet or isochronous) and outputting a mode select signal, as described more fully in commonly-assigned application Ser. No. 07/971,018 now abandoned, titled "NETWORK LINK ENDPOINT CAPABILITY DETECTION," filed on even date herewith and incorporated herein by reference.)

Both the non-isochronous-sourced data 94b and the isochronous-sourced data 94a are made available to the various hub circuitry components 54a, 54b, 54c, as needed for transmission to destination nodes. In one embodiment, the separated isochronous data 94a and non-isochronous data 94b are reconfigured by the respective interfaces 58, 60 to provide isochronous output 102 and non-isochronous output 104 in a form suitable for transmission to the destination nodes. In one embodiment, the non-isochronous data 94b is configured by the E interface 59 so that the output data 104 can be processed by a repeater device for provision to hub circuitry 54 and eventual transmission to destination nodes. As an alternative to using a repeater for the non-isochronous data, packet connections may be linked through media access control layer bridges.

Figure 6:
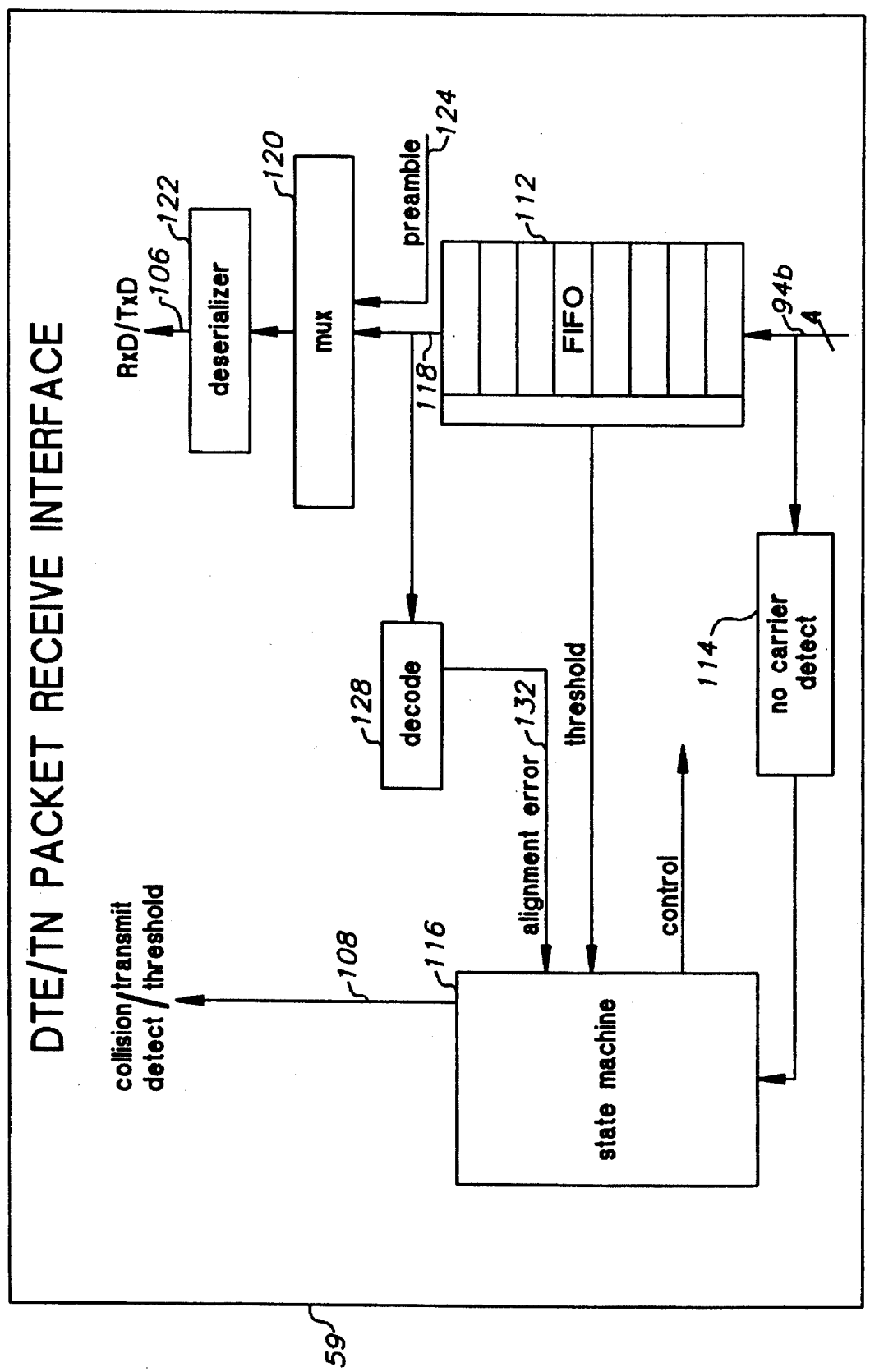
FIG. 6 is a block diagram of a receive interface for non-isochronous data according to an embodiment of the present invention.

FIG. 6 depicts one implementation of an E interface 59 of a type which will receive the non-isochronous data 94b and provide outputs 106, 108 of a type that can be processed by previously-available repeater circuitry 60. The non-isochronous data is received in a first-in-first-out (FIFO) buffer 112 to smooth out data rates. Circuitry 114 detects "no carrier" symbols, provided to emulate ethernet data packets, used by logic circuitry or state machine 116 to output carrier detect signals. The output 118 from FIFO 112 is provided to a multiplexer 120 and a de-serializer 122 to produce data output 106. Multiplexer 120 can receive a preamble stream 124 to provide the proper preamble bits in the output data 106. Output 118 from FIFO 112 is also provided to decode circuitry 128 to recognize data collision and alignment error symbols and output appropriate signals, 132 to state machine 116. Operation and components of the receive interface 59 are described more thoroughly in application Ser. No. 07/970,329, U.S. Pat. No. 5,361,261, titled "Frame-Based Transmission of Packet Data".

Figure 7:
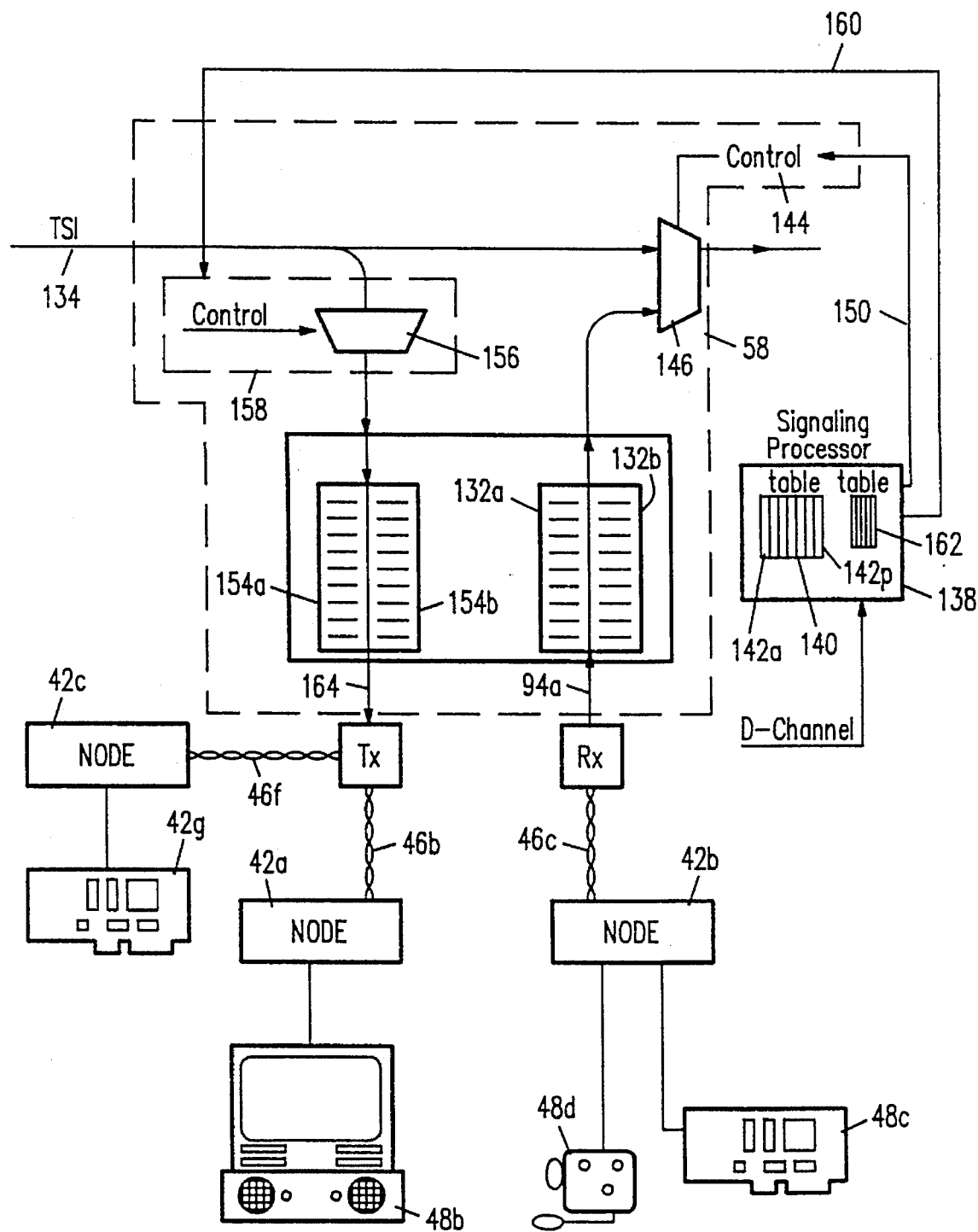
FIG. 7 is a diagram of a receive interface for isochronous data and associated hub circuitry according to an embodiment of the present invention.

For purposes of the present example, data from isochronous-source 48d (FIG. 7) is assumed transmitted in the first 24 Isochronous bytes of each frame represented by the "B" symbols in block 0 of Table I (i.e. the first forty-eight "B" symbols in the frame structure). FIG. 7 depicts a time slot interchange controller 58 according to one embodiment of the invention. In the embodiment of FIG. 7, the separated isochronous data 94a is stored in one of two buffers 132a, 132b. The timing of storage in the buffers 132a, 132b is coordinated with the 125 microsecond frame transmission timing so that data 94a from a first frame will be stored in the first buffer 132a during a first period of 125 microseconds and, during the next 125 microsecond period, the isochronous data 94a from the next frame will be stored in the second buffer 132b. In one embodiment, the data can be stored in the buffer 132 in the same order it is received, such that the eight bits represented by the first two "B" symbols in Table I is stored in the first storage location of buffer 132a, that corresponding to the second two "B" symbols in Table I is stored in the second location of buffer 132a and so on. Since the frame structure depicted in Table I contains 96 bytes of isochronous data per frame, each of the buffers 132a, 132b has the capacity to store 96 bytes of data per node supported. After isochronous data from a first frame is stored in buffer 132, during the next 125 microsecond period (while the data from the next frame is being stored in the second buffer 132b) data which was stored in the first buffer 132a may be transmitted onto a high bandwidth bus 134. The loading and ordering of the buffer 132 is dependent upon the number of nodes supported by hub 44a. Bus 134 has sufficient bandwidth to carry the isochronous data output from a plurality of nodes which are connected to the hub 44a. In an embodiment in which the hub 44a is connected to 16 nodes, the bandwidth of the bus 134 must be sufficient to receive 1,536 bytes of data (i.e. 16 nodes×96 bytes per node) every 125 microseconds (i.e. every frame). This corresponds to a bandwidth of about 98304 Kb/sec.

Depending upon aspects of the system configuration, such as the number of nodes attached to a hub and the bandwidth dedicated to isochronous data, other embodiments of the invention could be provided with other bandwidths in place of the TSI bus 134. However, the 98304 Kb/sec bandwidth is particularly useful because it substantially matches the bandwidth employed in FDDI-II, making it particularly easy to port the data on the TSI bus 134 to a TSI ring 58 (FIG. 3) in configurations where the TSI ring 58 is an FDDI-II system.

According to one embodiment, the data is conveyed from the buffer 132 into a time slot on the bus 134 in a time slot interchange fashion. Data carried on TSI bus 134 is transmitted in 125 microsecond time frames divided into 1,536 time slots, each of which has a duration of about 0.08138 microseconds. Each time slot has data and associated control and parity. Thus a byte could represent 10 bits of time slot information. Thus, data from buffer 132a may be placed onto TSI bus 134, by transmitting a given one of the 1,536 bytes stored in 132a on TSI bus 134 at the proper one of the 1,536 time slots of the 125 microsecond frame. Which of the time slots is "proper" depends on the use which is to be made of the data and, in particular, the destination for the data as predetermined in the connection set-up via the D channel.

The destination for data, in the depicted embodiment, has been pre-established using the D channel information. The D channel information is sent to a signaling processor 138. The D channel information, which includes source, destination, and other needed information is used to store values in preferably a switch table 140. In one example, switch table 140 may be divided into sixteen sections 142a–142p corresponding to the sixteen nodes associated with the hub circuitry 58 of this example. Each section 142 contains 1,536 bits, corresponding to the 1,536 time slots in a TSI bus time frame. These bits can be used as a control 144 for a multiplexer 146.

In the present example, the twenty-four bytes of data from 48d per 125 microsecond frame are conveyed in the first twenty-four B slots of each 48d frame. Thus, the data from source 48d will be stored in the isochronous data buffer 132. The destination for the isochronous data of this example is monitor 48b. Thus, the 24 B slots of data will be transferred to data buffer 154a and then on the next frame transmitted to 48b in its corresponding first 24 B slots.

The 24 B slots could have been destined for the TSI bus in which case the 24 B slots in 132 would have been switched onto the TSI bus. A bit of the contents of the switch table would have controlled line 150 to control the multiplexer 146 at a rate of one bit for every TSI time slot (i.e., one bit every 0.08138 microseconds). Assuming the first 10 time slots of the TSI bus do not receive the B data which is destined for a node attached to another hub, during the first TSI time slot, the multiplexer control 144 will be "0" and no data will be output from the buffer 132 onto bus 134. The multiplexer 146 will merely convey along the TSI bus 134 whatever data was already on the TSI bus in the first time slot. This continues until the 11th time slot of the TSI bus, at which time the B data destined for a node attached to another hub begins to be output onto the TSI bus. During each of the next 24 TSI bus time slots, the control signal for multiplexer 146 will be "1" and a byte of data stored in the appropriate data location of buffer 132 will be output through multiplexer 146 onto the bus 134. Which data location of the buffer 132 is "appropriate" can be determined by a read pointer contained in the switch table. Preferably, buffer 132 is a random access memory (RAM) and the read pointer will be determined according to the contents of the switch table, on representing the TSI slot time. After completion of conveying the 24 bytes onto the TSI bus, there will be no output from the buffer 132a during subsequent time slots of this TSI frame since in this example no other connections were established. In this way, time slots 11 through 35 for a frame on the TSI bus will be filled with data stored in the buffer 132a, i.e. the 24 bytes of data output by the isochronous source 48d.

FIG. 7 also depicts transmission of the isochronous data retrieved from TSI bus 134 to a destination node. The present example requires hub 44a to retrieve the twenty-four bytes of data stored in the first twenty-four even-numbered time slots of the transmitted frame. Data from the TSI ring is retrieved by the B interface 57 associated with sink 48b.

Retrieval from the TSI ring is achieved by a multiplexer 156 controlled by a control signal 158 output over line 160 from the signal processor 138, relying on a Table 162 in a fashion similar to that described for control of multiplexer 146.

Figure 8:
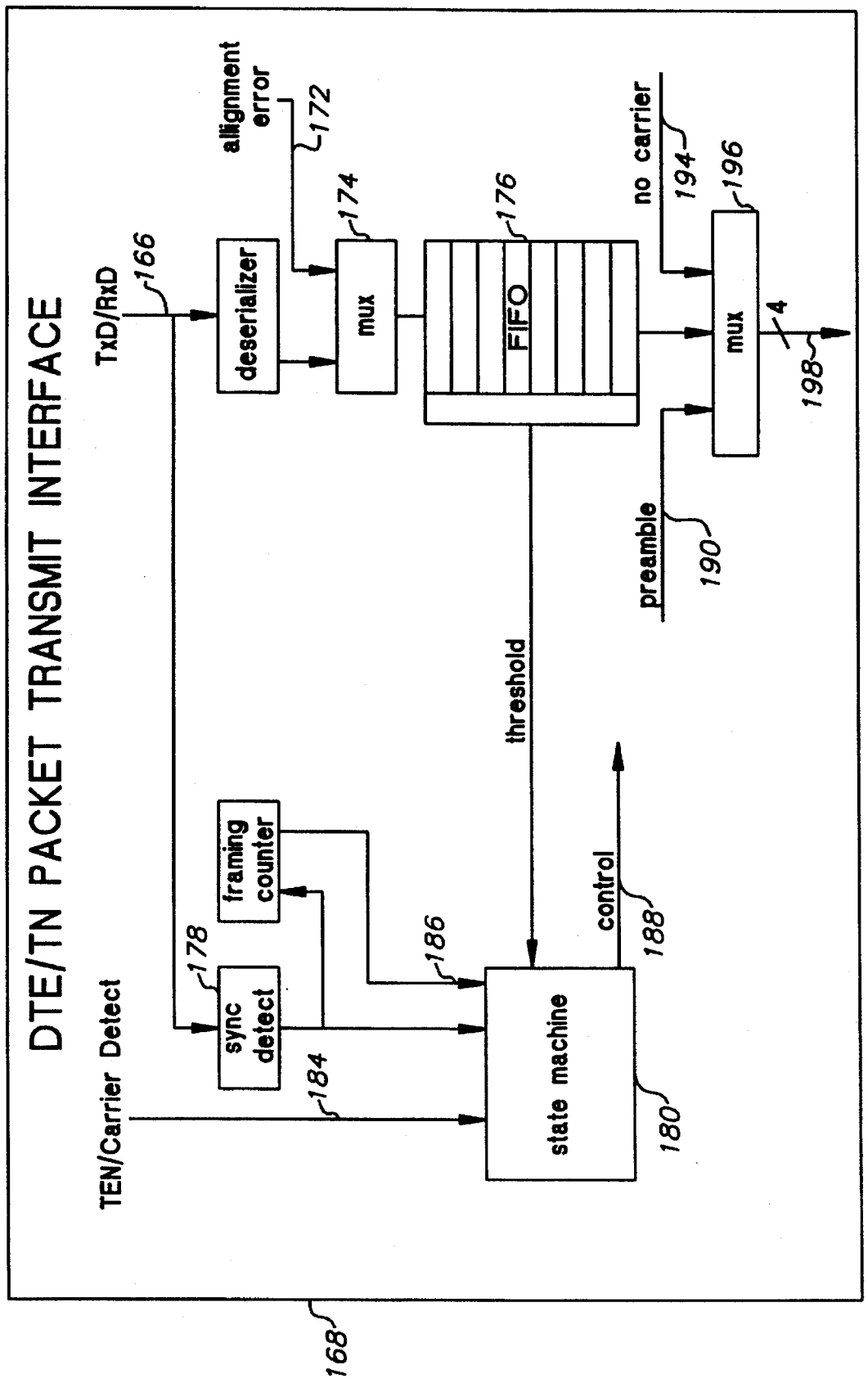
FIG. 8 is a block diagram of a hub transmit interface for non-isochronous data according to an embodiment of the present invention.

The E interface 59 of hub 44a retrieves the non isochronous data (source 48c) from repeater 60 intended for the non-isochronous sink 48g. An example of an E transmit interface 168 is depicted in FIG. 8. The transmit interface depicted in FIG. 8 is in general, the functional inverse of the E receive interface 60 depicted in FIG. 6. The data 166 is de-serialized and is then combined with any necessary alignment error bits 172 in a multiplexer 174, the output of which is conveyed to a FIFO 176. A parallel interface could also be provided, without the need for the FIFO when in MAC. A sync detect circuit 178 extracts synchronization information from the repeater output 166 for conveying to a state machine 180. State machine 180 also receives carrier detect information 184, framing counter information 186, and provides control signals 188 to FIFO 176. The data output from FIFO 176 is multiplexed with preamble bits 190, and "null carrier" bits 194 by a multiplexer 196. Operation of the E transmit interface is described more thoroughly in the application Ser. No. 07/970,329, titled "Frame-Based Transmission of Data".

Figure 9:
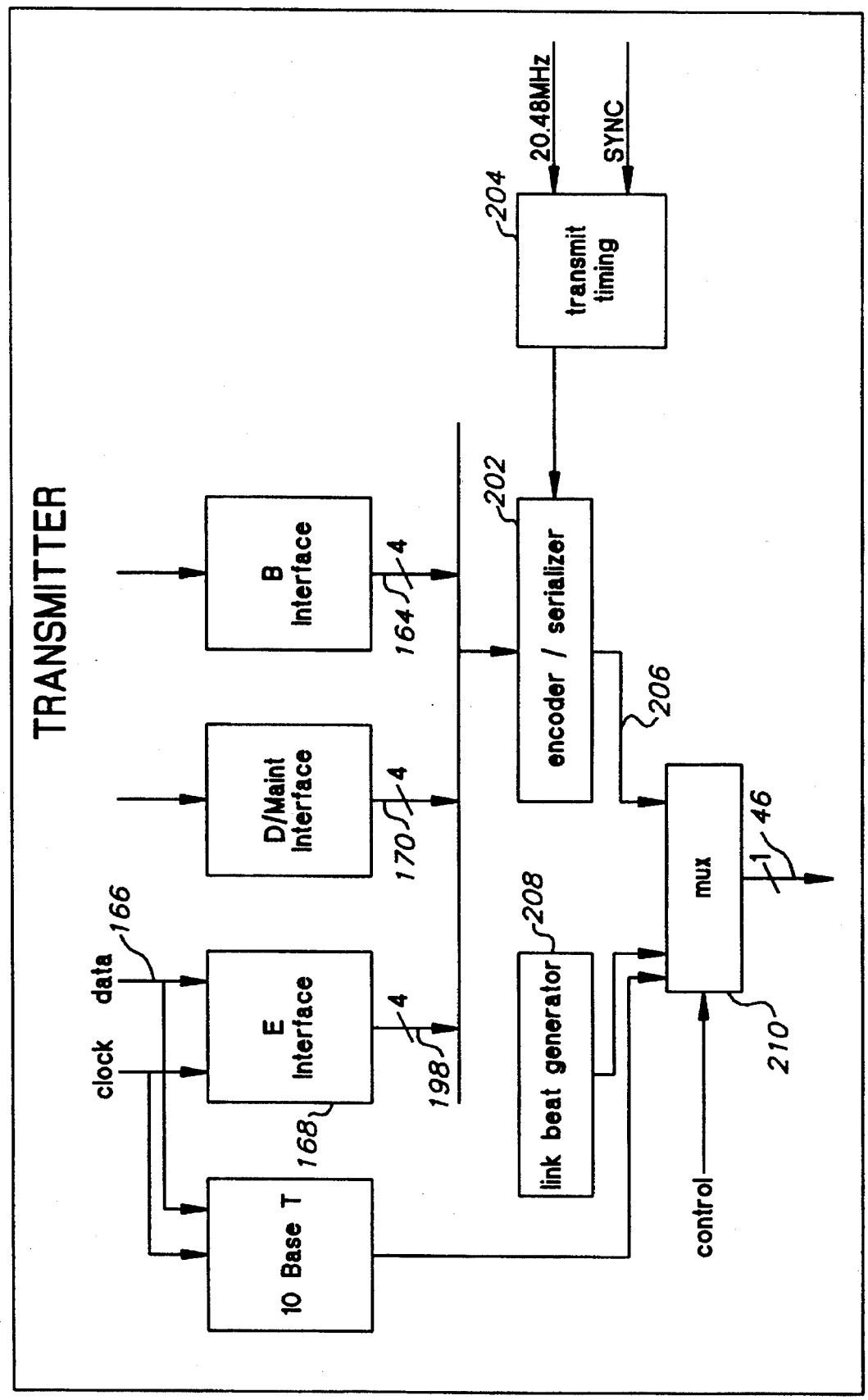
FIG. 9 is a block diagram of a hub transmitter interface for non-isochronous data according to an embodiment of the present invention.

The data 198 output from E transmit interface 168 is provided along with isochronous data output 164 and M channel and D channel data 170 to encoder serializer circuitry 202, as depicted in FIG. 9. Encoder/serializer 202 is configured substantially like the encoding circuitry depicted in FIG. 4. Specifically, encoder/serializer 202 provides a multiplexer for combining the three streams of data 198, 170, 164, a four/five encoder, an NRZI encoder, and pre-emphasis circuitry. The timing of transmission is controlled by transmit timing circuitry 204. Output 206 from the encoder/serializer is selectively combined with link beats from a link beat generator 208 by multiplexer 210 for purposes of link end point detection, as described more thoroughly in application Ser. No. 07/971,018.

Both isochronous and non-isochronous data sent from hub 44a to the nodes 42 is sent in a frame format which is preferably substantially the same as the frame format used for the data sent from the nodes 48 to the hub 44a as described above. At the nodes 42, the circuitry 50 includes devices (FIG. 4) for decoding and de-multiplexing data, similar to that described for performing these functions in the hub, mainly a phase lock decode 86, and NRZI decode 88, a four/five decode 90, and a de-multiplexer 92. Decoded and de-multiplexed data is then delivered to the various data sinks in the nodes 42.

Figure 10:
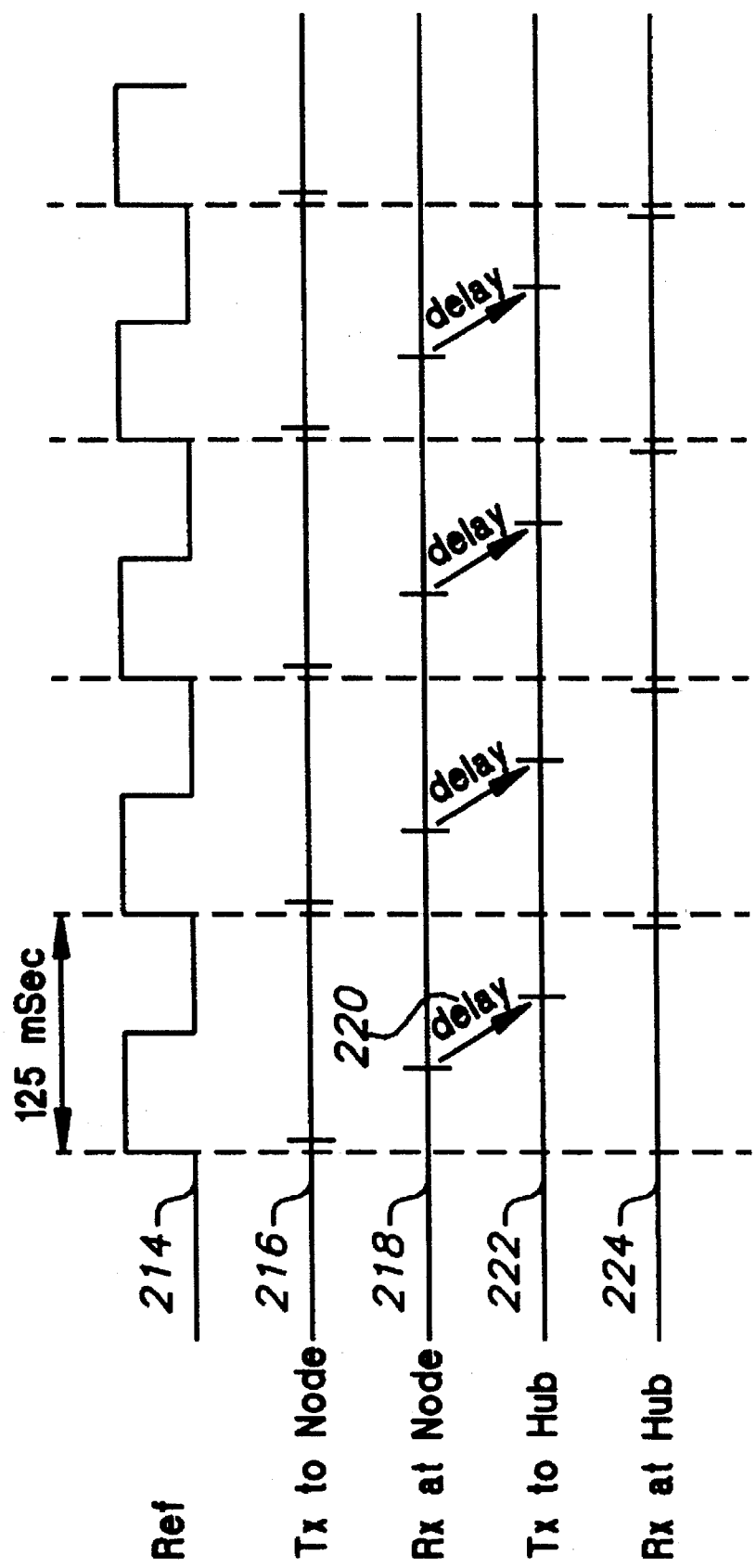
FIG. 10 is a timing chart for coordinating data transfers according to an embodiment of the present invention.

FIG. 10 depicts a timing scheme to reduce delay, jitter and minimizing the amount of buffering memory required. As shown in FIG. 10, the timing can be synchronized with a 125 microsecond reference clock signal 214 that provides an ascending clock edge every 125 microseconds. The reference signal can be provided by any of a number of sources, including by synchronization to an external clock reference, such as a reference signal from a wide band network or from a FDDI-II ring. At the beginning of a cycle, hub 44 begins to transmit a frame to the node, as indicated by the timing marks on time line 216. Because of the line delays in the physical media, the time at which the nodes receive the frame transmitted by the hub lags the time when the frame was sent from the hub as shown by time line 218. A delay 220 is therefore introduced before the node begins transmission of the next frame to hub 222. Delay 220 accounts for the latency introduced by transmission over physical media 46, such that the hub begins receiving the transmitted frame at times 224 approximately coinciding with the rising edges of the clock signals 214.

Figure 11:
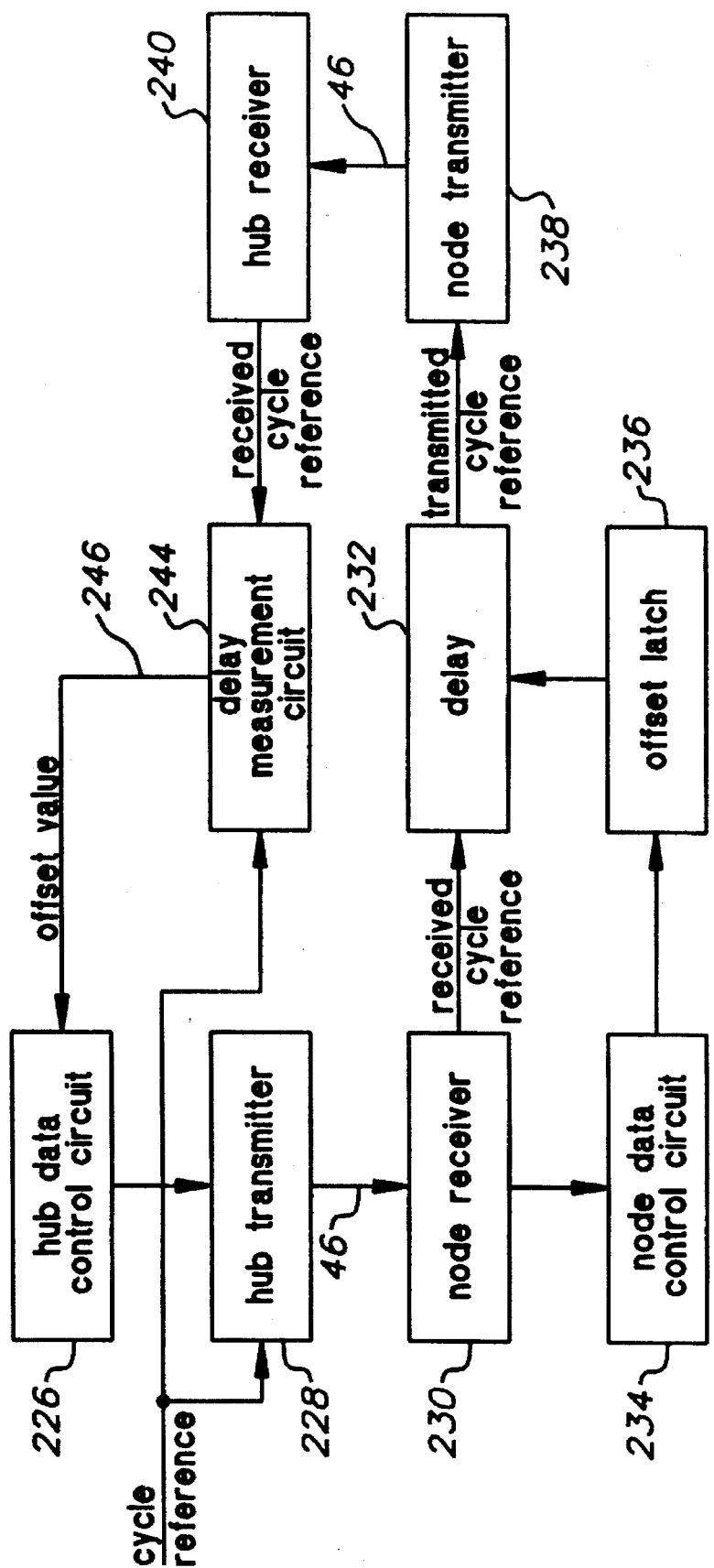
FIG. 11 is a block diagram of node circuitry having a delay circuit according to an embodiment of the present invention.

Delay 220 may be introduced by inserting delay circuitry 226a, 226b between the receiving circuitry 78a, 78b and the nodes 42a, 42b and the transmitting circuitry 228a, 228b and the nodes 42a, 42b. See FIG. 11. Because the latency of physical media varies from node to node, in dependance upon the length of the links, the length of the delay inserted by circuitry 226a also varies as appropriate. A calculated optimal delay can also be programmed into the circuitry 228a, 228b as appropriate. The delay feature is described in more detail in commonly-assigned application Ser. No. 07/970,313, U.S. Pat. No. 5,406,559, titled "Isochronous Link Protocol", filed on even date herewith and incorporated herein by reference.

The timing scheme described above guarantees that the cycle received from the node arrives slightly sooner than the next cycle transmitted from the hub. A small FIFO can be inserted into the hub's received data stream to accurately align the arrival of the cycle. A similar FIFO structure may be used in the node to synchronized data with the received cycle reference until it is to be transmitted. Provision of these FIFOs is described in more detail in commonly-assigned application Ser. No. 07/969,917, abandoned, titled "Apparatus and Method for Accommodating Cable Length Delays Using Isochronous FIFOing", filed on even date herewith and incorporated herein by reference.

Local Loopback

In the generalized system described above, data transfers between nodes occur by relaying the data from the source node to the hub; placing the data onto the TSI ring that interconnects the hubs; retrieving the data from the TSI ring at the destination hub, and routing the data from the destination hub to the destination node. This process wastes TSI bandwidth and introduces system delay when both the source and destination node connect to the same hub.

According to the present invention, circuitry 58 can also be provided with a local loopback capability. The local loopback capability permits circuitry 58 to transfer data directly from the receive buffer 132 to the transmit buffer 154 without placing the data onto TSI ring 134, thus freeing TSI bus bandwidth for other hubs to use (FIGS. 2A and 2B). Multiplexer 156 can be used to control loopback.

Local loopback capability is useful, for example, when both an isochronous source and an isochronous sink are connected to the same hub. For example, in the example previously described, both video camera isochronous source 48d and video monitor isochronous sink 48b are connected with the same hub 44a. Local loopback can be used to provide data to the monitor 48b for displaying images received by the video camera 48d, substantially in "real time," but without placing the data on the TSI bus 134. Non-isochronous loopback is achieved by the non-isochronous repeater device 60 such as a DP83950 Repeater Interface Controller (RIC), manufactured by National Semiconductor, Santa Clara, Calif.

Figure 12:
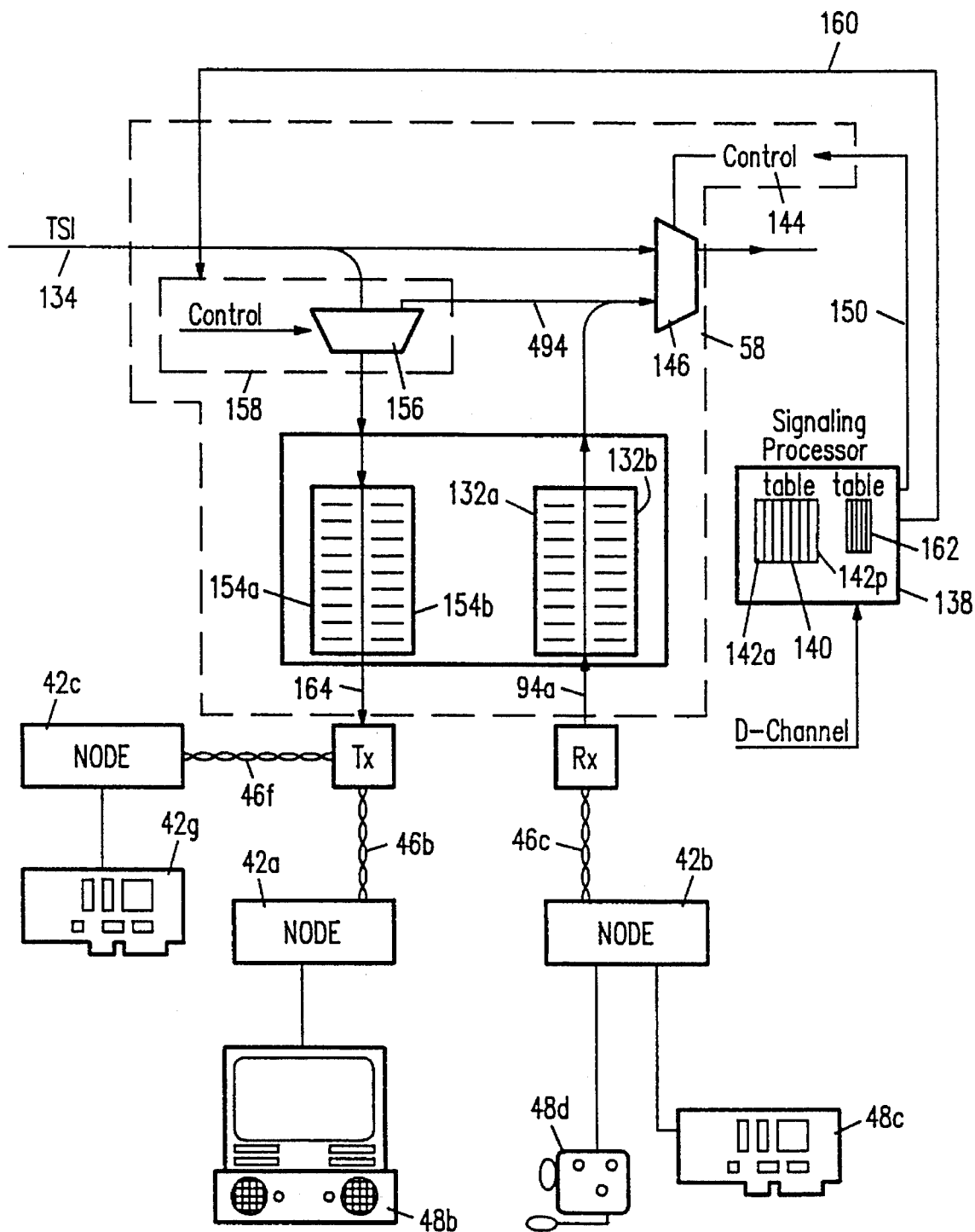
FIG. 12 is a diagram of a receive interface for isochronous data having a local loopback capability according to an embodiment of the present invention.

FIG. 12 shows a structure for implementing isochronous local loopback. A data line 494 is coupled to receive the data transferred from buffer 132 that normally gets placed on the TSI ring 134. Data line 494 is input to multiplexer 156 for an internal loopback which prevents the data on 134 from being input into buffer 154. Multiplexer 156 is controlled via line 160 by one of the switch tables in 138. Control data is stored in an output Table 162 according to destination information provided over the D channel to the signaling processor 138. Table 162 must now, however, be sufficiently wide to store enough control bits to control both the TSI and loopback 156 multiplexer inputs. Where an internal loopback is initiated, the data from 132a is transferred to 154, in place of a time slot. Thus, if an internal loopback is initiated at a time slot, the associated TSI data is not loaded into 154a. Multiplexer 156 is used along with control line 158 which indicates the internal loopback. The control of the control line 158 is done by the signaling processor, and in one embodiment is a look up table.

The two buffers 154a, 154b store the retrieval data and are controlled in the manner previously described. During a first time frame, buffer 154a receives data from line 494 or TSI bus 134 while buffer 154b outputs data, stored during the previous time frame, to line 164 of circuitry 58 for transmission to the destination node 42a via physical media 46b. During the next time frame, the roles of these buffers reverse such that data retrieved from line 494 is stored in buffer 156b and the data stored in 154a during the previous frame is output for transmission to the destination node 42a.

Another advantage of the loopback provision of the present invention is the possible elimination of the TSI ring 134 if a stand alone hub is implemented. If the data communication network consists of a single hub, then only data line 494 is necessary to connect the hub receive and transmit buffers. Multiplexer 156 operates in the previously described fashion to place data in buffer 154 from 132. Connections to a separate TSI bus are therefore no longer needed, but may be optionally provided.

Although the present invention has been described by way of preferred embodiments and certain variations and modifications, other variations and modifications can also be used, the invention being defined by the following claims.

TABLE I

| BLOCK 0: | | | | | | | | | | | | | | | | |
|---|---|---|---|---|---|---|---|---|---|---|---|---|---|---|---|---|
| J | K | E | B | E | B | E | B | E | B | E | B | E | B | E | E | Group 0 |
| E | E | E | B | E | B | E | B | E | B | E | B | E | B | E | E | Group 1 |
| E | E | E | B | E | B | E | B | E | B | E | 3 | E | B | E | E | Group 2 |
| E | E | E | B | E | B | E | B | E | B | E | B | E | B | E | E | Group 3 |
| E | E | E | B | E | B | E | B | E | B | E | B | E | B | E | E | Group 4 |
| E | E | E | B | E | B | E | B | E | B | E | B | E | B | E | E | Group 5 |
| E | E | E | B | E | B | E | B | E | B | E | B | E | B | E | E | Group 6 |
| E | E | E | B | E | B | E | B | E | B | E | B | E | B | E | E | Group 7 |
| BLOCK 1: | | | | | | | | | | | | | | | | |
| M | M | E | B | E | B | E | B | E | B | E | B | E | B | E | E | Group 8 |
| E | E | E | B | E | B | E | B | E | B | E | B | E | B | E | E | Group 9 |
| E | E | E | B | E | B | E | B | E | B | E | B | E | B | E | E | Group 10 |
| E | E | E | B | E | B | E | B | E | B | E | B | E | B | E | E | Group 11 |
| E | E | E | B | E | B | E | B | E | B | E | B | E | B | E | E | Group 12 |
| E | E | E | B | E | B | E | B | E | B | E | B | E | B | E | E | Group 13 |
| E | E | E | B | E | B | E | B | E | B | E | B | E | B | E | E | Group 14 |
| E | E | E | B | E | B | E | B | E | B | E | B | E | B | E | E | Group 15 |
| BLOCK 2: | | | | | | | | | | | | | | | | |
| D | D | E | B | E | B | E | B | E | B | E | B | E | B | E | E | Group 16 |
| E | E | E | B | E | B | E | B | E | B | E | B | E | B | E | E | Group 17 |
| E | E | E | B | E | B | E | B | E | B | E | B | E | B | E | E | Group 18 |
| E | E | E | B | E | B | E | B | E | B | E | B | E | B | E | E | Group 19 |
| E | E | E | B | E | B | E | B | E | B | E | B | E | B | E | E | Group 20 |
| E | E | E | B | E | B | E | B | E | B | E | B | E | B | E | E | Group 21 |
| E | E | E | B | E | B | E | B | E | B | E | B | E | B | E | E | Group 22 |
| E | E | E | B | E | B | E | B | E | B | E | B | E | B | E | E | Group 23 |
| BLOCK 3: | | | | | | | | | | | | | | | | |
| E | M | E | B | E | B | E | B | E | B | E | B | E | B | E | E | Group 24 |
| E | E | E | B | E | B | E | B | E | B | E | B | E | B | E | E | Group 25 |
| E | E | E | B | E | B | E | B | E | B | E | B | E | B | E | E | Group 26 |
| E | E | E | B | E | B | E | B | E | B | E | B | E | B | E | E | Group 27 |
| E | E | E | B | E | B | E | B | E | B | E | B | E | B | E | E | Group 28 |
| E | E | E | B | E | B | E | B | E | B | E | B | E | B | E | E | Group 29 |
| E | E | E | B | E | B | E | B | E | B | E | B | E | B | E | E | Group 30 |
| E | E | E | B | E | B | E | B | E | B | E | B | E | B | E | E | Group 31 |

JK = Frame Synchronization Pattern
MM = 8 Maintenance Bits
D = D Channel
EM = Ethernet Pad & 4 Maintenance Bits
E = Ethernet Packet Channel
B = Isochronous Channel

TABLE II

| Symbol | Encoded (5 bit) | Decoded (4 bit) | Description |
|---|---|---|---|
| 0 | 11110 | 0000 | Data 0 |
| 1 | 01001 | 0001 | Data 1 |
| 2 | 10100 | 0010 | Data 2 |
| 3 | 10101 | 0011 | Data 3 |
| 4 | 01010 | 0100 | Data 4 |
| 5 | 01011 | 0101 | Data 5 |
| 6 | 01110 | 0110 | Data 6 |
| 7 | 01111 | 0111 | Data 7 |
| 8 | 10010 | 1000 | Data 8 |
| 9 | 10011 | 1001 | Data 9 |
| A | 10110 | 1010 | Data A |
| B | 10111 | 1011 | Data B |
| C | 11010 | 1100 | Data C |
| D | 11011 | 1101 | Data D |
| E | 11100 | 1110 | Data E |
| F | 11101 | 1111 | Data F |
| I | 11111 | 1010 | No Ethernet Carrier |
| S | 11001 | 0111 | No Ethernet Data |
| V | 01100 | 0010 | Unaligned Data |
| T | 01101 | 0101 | Unassigned |
| J | 11000 | 1101 | Frame Sync Part 1 |
| K | 10001 | 1101 | Frame Sync Part 2 |

TABLE II-continued

| Symbol | Encoded (5 bit) | Decoded (4 bit) | Description |
| --- | --- | --- | --- |
| Q | 00000 | 0010 | Invalid |
| H | 00100 | 0001 | Invalid |
| R | 00111 | 0110 | Invalid |
| V | 00001 | 0110 | Invalid |
| V | 00010 | 0010 | Invalid |
| V | 00011 | 0010 | Invalid |
| V | 00101 | 0010 | Invalid |
| V | 00110 | 0010 | Invalid |
| V | 01000 | 0010 | Invalid |
| V | 10000 | 0010 | Invalid |

What is claimed is:

1. An apparatus for communicating data among a plurality of data sources and sinks, said apparatus comprising a plurality of nodes, each node having at least one of said sources and sinks coupled thereto said apparatus further comprising a plurality of hubs, each hub having at least one of said nodes coupled thereto, one of said sources configured to transmit data isochronously, one of said sources configured to transmit data non-isochronously, one of said sinks configured to receive data isochronously, and one of said sinks configured to receive data non-isochronously, the apparatus comprising:

each node having:
 (a) a node transmitter;
 (b) a node receiver;
 (c) a multiplexer coupled to said node transmitter for transmitting data from both isochronous and non-isochronous sources over a first data link, said multiplexer providing a data stream transmitted as a plurality of data frames, at least one frame including isochronous data originating from an isochronous source and destined for an isochronous sink and non-isochronous data originating from a non-isochronous source and destined for a non-isochronous sink;

each hub coupled to at least one node, said hub having:
 (a) a hub receiver coupled to said transmitter of at least one node to receive data transmitted from said node via said first data link;
 (b) a hub transmitter coupled to said receiver of said at least one node to transmit data to said node;
 (c) a second data link coupling said hub receiver to said hub transmitter;
 (d) a third data link coupling said hub receiver to another of said plurality of said hubs; and
 (e) a switch, disposed on said second data link between said hub receiver and said hub transmitter, and coupled to a control signal, wherein data passes from said hub receiver to said hub transmitter over said second data link when said control signal is in a first condition and wherein data passes from said hub receiver to another of said plurality of hubs over said third data link when said control signal is in a second condition.

2. The apparatus of claim 1 further comprising:
a second hub coupled to a second node; and
a bus coupled to at least one of said hub receiver and said hub transmitter of said first hub and to said second hub for passing data between said first hub and said second hub.

3. The apparatus of claim 1, wherein said at least one node comprises two nodes.

4. The apparatus of claim 1, wherein said switch comprises a multiplexer.

5. The apparatus of claim 1, wherein said hub receiver further comprises a buffer for storing data received from said node.

6. The apparatus of claim 1, wherein said hub transmitter further comprises a buffer for storing data for transmittal to said node.

7. The apparatus of claim 1, wherein said hub further comprises a memory device for storing said control signal.

8. The apparatus of claim 1, wherein said second data link carries isochronous data.

9. The apparatus of claim 1 wherein said data stream further comprises a channel of control data.

10. The apparatus of claim 1 further comprising a signaling processor for generating said control signal as a function of the destination of the data.

11. The apparatus of claim 10 wherein said signaling processor comprises a switch table containing said control signal.

12. A method for communicating data comprising the steps of:

receiving a first set of isochronous data and a second set of non-isochronous data at a first node;

multiplexing said first set and said second set of data to form a multiplexed data set;

transmitting to a first hub via a first data link, said multiplexed data set as a plurality of data frames having non-isochronous and isochronous data; at least one of said data frames having data destined for a first destination device and data destined for a second destination device different from said first destination device;

demultiplexing said multiplexed data set at a hub receiver to obtain an isochronous data portion and a non-isochronous data portion;

passing said isochronous data portion from said hub receiver to a hub transmitter over a second data link when a first control signal is asserted; and passing said isochronous data portion from said hub receiver to a bus and communicating said isochronous data portion from said first hub to a second hub via said bus when a second control signal is asserted.

13. The method for communicating data of claim 12, further comprising the step of:

transmitting said isochronous data portion from said hub transmitter to one of a plurality of nodes coupled to said first hub.

14. The method for communicating data of claim 12, further comprising the step of:

repeating said non-isochronous data portion using a repeater device.

15. The method of claims 12 further including the step of transmitting a separate channel of control data in said data frames.

16. A method as set forth in claim 12 further comprising the step of generating said first and second control signals as a function of a destination of said data.

17. The method of claim 16 wherein said step of generating said first and second control signals comprises:

storing at least destination information for said data in a switch table, and generating said control signals as a function of the destination information stored in said switch table.

18. In a communication system having a plurality of hubs coupled to exchange data between a plurality of nodes, the hub apparatus comprising:

a receiver circuit for receiving a data frame having isochronous and non-isochronous data from said nodes;

a transmit circuit for transmitting said data frame to said nodes wherein said data frame includes data having a first destination and data having a second destination different from said first destination;

a first data link coupling said receive circuit to said transmit circuit;

a switch, disposed on said first data link, and coupled to a control signal, wherein said isochronous data passes from said receive circuit to said transmit circuit when a first control signal is asserted; and a second data link, coupled to one of said receive circuit and said transmit circuit and to another one of said plurality of hubs, for exchanging data with said other one of said plurality of hubs when a second control signal is asserted.

19. The hub apparatus of claim 18, further comprising:

a repeater circuit, coupled to said receive circuit for transmitting said non-isochronous data from said receive circuit to said transmit circuit.

20. The hub apparatus of claim 18 wherein said data frame further includes a channel for control information.

21. The apparatus recited in claim 18 further comprising a signaling processor for generating said first and second control signals as a function of the destination of the data.

22. The apparatus of claim 21 wherein said signaling processor comprises a switch table containing said first and second control signals.

* * * * *